US012054239B2

(12) United States Patent
Clark

(10) Patent No.: US 12,054,239 B2
(45) Date of Patent: *Aug. 6, 2024

(54) IN-FLIGHT STABILIZATION OF AN AIRCRAFT

(71) Applicant: BETA AIR, LLC, South Burlington, VT (US)

(72) Inventor: Kyle B. Clark, Underhill, VT (US)

(73) Assignee: BETA Air, LLC, South Burlington, VT (US)

(*) Notice: Subject to any disclaimer, the term of this patent is extended or adjusted under 35 U.S.C. 154(b) by 178 days.

This patent is subject to a terminal disclaimer.

(21) Appl. No.: 17/404,809

(22) Filed: Aug. 17, 2021

(65) Prior Publication Data

US 2021/0380224 A1 Dec. 9, 2021

Related U.S. Application Data

(63) Continuation-in-part of application No. 16/713,520, filed on Dec. 13, 2019, now Pat. No. 11,592,841.
(Continued)

(51) Int. Cl.
*B64C 13/16* (2006.01)
*B64C 13/04* (2006.01)
(Continued)

(52) U.S. Cl.
CPC .............. *B64C 13/16* (2013.01); *B64C 13/04* (2013.01); *B64D 27/24* (2013.01); *G05D 1/0016* (2013.01); *G06N 20/00* (2019.01)

(58) Field of Classification Search
CPC ........ B64C 13/16; B64C 13/04; G06N 20/00; B64D 27/24; G05D 1/0016
See application file for complete search history.

(56) References Cited

U.S. PATENT DOCUMENTS 8,576,530 B2  11/2013 Aronson
9,376,208 B1*  6/2016 Gentry .................. B64D 35/08
(Continued)

FOREIGN PATENT DOCUMENTS

CN   103963963 B   1/2016
CN   103963963 B   1/2016
(Continued)

OTHER PUBLICATIONS

PCT,US20,63598; International Search Report; Mar. 10, 2021 Authorized Officer: Lee Young.
(Continued)

*Primary Examiner* — Hussein Elchanti
(74) *Attorney, Agent, or Firm* — Lee & Hayes, P.C.

(57) ABSTRACT

A system for in-flight stabilization including a plurality if flight components mechanically coupled to an aircraft. The system further comprises a sensor mechanically coupled to the aircraft, wherein the sensor is configured to detect a failure datum of the flight component. The system comprises a vehicle controller communicatively connected to the sensor and is configured to receive the failure datum of a flight component of the aircraft from the sensor, generate a mitigating response to be performed by at least a flight component of the plurality of flight components, and initiate the at least a flight component of the plurality of flight components. Initiating the flight component of the plurality of flight components further includes performing the mitigating response.

20 Claims, 6 Drawing Sheets

Related U.S. Application Data

(60) Provisional application No. 62/912,741, filed on Oct. 9, 2019.

(51) Int. Cl.
  *B64D 27/24* (2006.01)
  *G05D 1/00* (2006.01)
  *G06N 20/00* (2019.01)

(56) References Cited

U.S. PATENT DOCUMENTS

| | | | |
|---|---|---|---|
| 9,397,502 | B2 | 7/2016 | Weir |
| 9,639,087 | B1 * | 5/2017 | Cutler ................. G05D 1/0055 |
| 9,828,107 | B1 * | 11/2017 | Ruymgaart ............ B64D 31/00 |
| 9,914,535 | B2 | 3/2018 | Paulos |
| 10,005,560 | B2 | 6/2018 | Vallart |
| 10,014,707 | B2 | 7/2018 | Rideau |
| 10,106,268 | B2 | 10/2018 | Rossotto |
| 10,124,893 | B1 * | 11/2018 | Aalund ................. G08C 17/02 |
| 10,322,814 | B1 | 6/2019 | Tian |
| 11,459,960 | B2 * | 10/2022 | Darfeuil ................. B64D 31/02 |
| 11,584,541 | B2 * | 2/2023 | List ....................... B64C 39/024 |
| 11,592,841 | B2 * | 2/2023 | Clark .................... B64D 45/00 |
| 11,827,346 | B1 | 11/2023 | Clark |
| 2010/0305792 | A1 | 12/2010 | Wilk |
| 2016/0280386 | A1 | 9/2016 | Mestler |
| 2017/0088284 | A1 * | 3/2017 | Holder .................. B64D 45/00 |
| 2017/0148236 | A1 * | 5/2017 | Sannino ................ G06F 16/242 |
| 2017/0313433 | A1 * | 11/2017 | Ozaki ................... B64D 17/80 |
| 2018/0237148 | A1 | 8/2018 | Hehn |
| 2018/0240330 | A1 * | 8/2018 | Choi .................... G08G 5/0069 |
| 2018/0290735 | A1 | 10/2018 | Uptigrove |
| 2018/0305005 | A1 | 10/2018 | Parks |
| 2018/0321676 | A1 * | 11/2018 | Matuszeski .......... G05D 1/0016 |
| 2019/0017569 | A1 * | 1/2019 | Eller .................... G05D 1/0858 |
| 2019/0033861 | A1 | 1/2019 | Groden |
| 2019/0135411 | A1 | 5/2019 | Gonzalez |
| 2019/0310654 | A1 | 10/2019 | Halder |
| 2020/0079501 | A1 | 3/2020 | Graves |
| 2020/0223547 | A1 * | 7/2020 | Mehta .................. G05D 1/0858 |
| 2020/0312163 | A1 * | 10/2020 | Dürr ....................... F03D 80/00 |
| 2020/0398983 | A1 * | 12/2020 | Singh .................. B64C 29/0033 |
| 2021/0139134 | A1 * | 5/2021 | Atkins .................... B64C 27/64 |
| 2022/0009626 | A1 | 1/2022 | Baharav |

FOREIGN PATENT DOCUMENTS

| | | |
|---|---|---|
| CN | 107074357 A | 8/2017 |
| CN | 107074357 B | 9/2019 |

OTHER PUBLICATIONS

Csank, Overview of Intelligent Power Controller Development for the Deep Space Gateway, Presentation, 2017, Cleveland, Ohio, USA.

Jansen, et al., Overview of NASA Electrified Aircraft Propulsion Research for Large Subsonic Transports, Presentation, 2017, Cleveland, Ohio, USA.

Office Action for U.S. Appl. No. 18/139,743, mailed on Jan. 30, 2024, Kyle Clark, "Vertical Take-Off and Landing (VTOL) Aircraft", 29 pages.

* cited by examiner

IN-FLIGHT STABILIZATION OF AN AIRCRAFT

CROSS-REFERENCE TO RELATED APPLICATIONS

This application is a continuation in part of U.S. Non-provisional patent application Ser. No. 16/713,520, filed on Dec. 13, 2019, and entitled "IN-FLIGHT STABILIZATION OF AN AIRCRAFT," which claims the benefit of priority of U.S. Provisional Patent Application Ser. No. 62/912,741, filed on Oct. 9, 2019, and titled "IN-FLIGHT STABILIZATION OF AN AIRCRAFT," which is incorporated by reference herein in its entirety.

FIELD OF THE INVENTION

The present invention generally relates to the field of electrically propelled vehicles. In particular, the present invention is directed to a system and method for in-flight stabilization of an aircraft.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo.

SUMMARY OF THE DISCLOSURE

In an aspect, a system for in-flight stabilization. The system comprising a plurality of flight components mechanically coupled to an aircraft; a sensor mechanically coupled to the aircraft, wherein the sensor is configured to detect a failure datum of a flight component of the aircraft; and a vehicle controller communicatively connected to the sensor. The vehicle controller designed and configured to receive the failure datum of a flight component of the aircraft from the sensor; generate a mitigating response to be performed by at least a flight component of the plurality of flight components; and initiate at least a flight component of the plurality of flight components, wherein initiating the flight component of the plurality of flight components further includes performing the mitigating response.

In an aspect, a method for in-flight stabilization. The method comprising detecting, by a sensor, a failure datum of a flight component of an aircraft; receiving, by a vehicle controller, the failure datum of a flight component of the aircraft from the sensor; generating, by the vehicle controller, a mitigating response to be performed by an flight component of the plurality of flight components; and initiating, by the vehicle controller, the flight component of the plurality of flight components, wherein initiating the flight component of the plurality of flight components further comprises performing the mitigating response.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
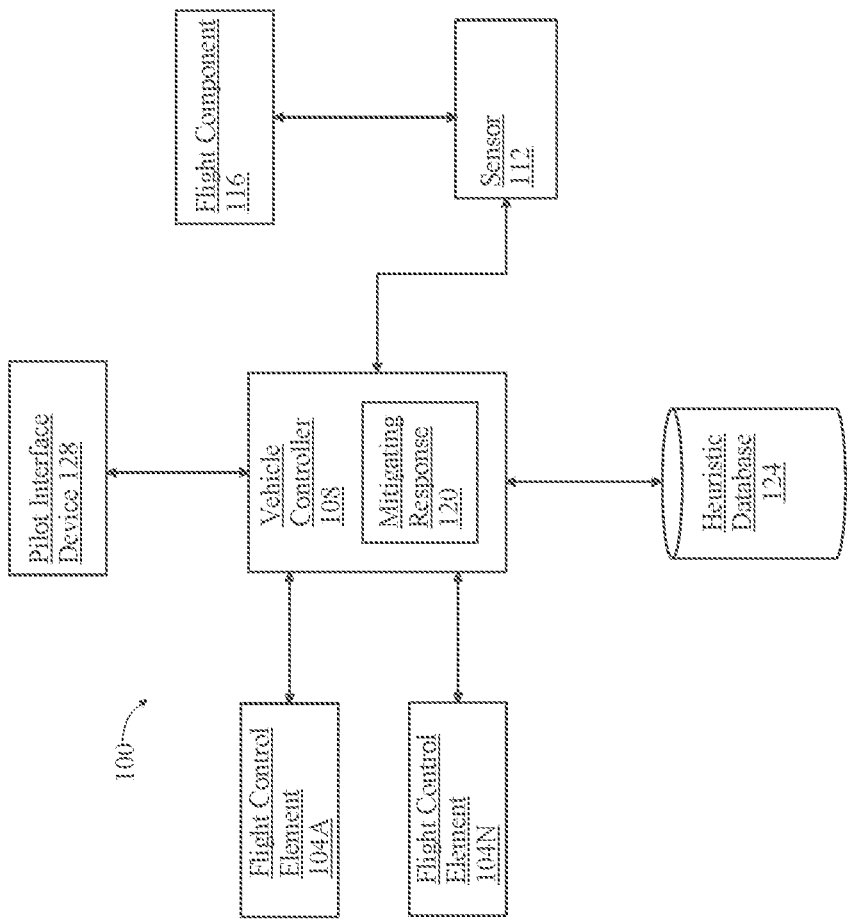
FIG. 1 is a block diagram depicting an exemplary embodiment for an in-flight stabilization system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for identifying a catastrophic event in an electric aircraft and calculating a flight maneuver using mitigation methodology. Aspects of the present disclosure can be used to enable the safe landing of an electric aircraft during situations where there is a failure of a component needed to continue and execute the expected flight plan. Catastrophic failure of an aircraft structure, loss of a prime flight control, or loss of a propulsion unit frequently may result in the loss of control or breakup of an airframe and loss of life. Existing attempts to mitigate failures, or prevent catastrophic outcomes include ballistic parachute systems that fire a physical parachute to carry the entire airframe to the ground and/or ejection seats offer some protection from loss of airframe and life. Other methods require gross redundancy of controllers, actuators, equipment and propulsion systems to maintain function upon loss of one or more such redundantly equipped elements.

Referring to FIG. 1, an exemplary embodiment of system 100 for in-flight stabilization system is illustrated. In-flight stabilization system 100 is configured to identify a catastrophic failure of a flight control element and mitigating the failure and/or prevent catastrophic outcomes by attempting varying iterations of mitigating responses. In-flight stabilization system 100 can include a plurality of flight control elements 104A-N vehicle controller 108, sensor 112, flight component 116, heuristic database 124, or any combination thereof.

In an embodiment, flight control elements 104A-N can be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. While the illustrative embodiment of FIG. 1 shows in-flight stabilization system 100 having two flight control elements 104A-N, in other embodiments, in-flight stabilization system 100 may have any number of flight control elements.

With continued reference to FIG. 1, flight control elements 104A-N may each include any portion of an aircraft that can be moved or adjusted to affect altitude, airspeed velocity, groundspeed velocity or direction during flight. For example, a flight control element 104A-N may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, a flight control element 104A-N may include a rudder, which may include, without limitation, a segmented rudder. The rudder may function, without limitation, to control yaw of an aircraft. Also, a flight control element 104A-N may include other flight control surfaces such as propulsors, rotating flight controls, or any other structural features which can adjust the movement of the aircraft.

Still referring to FIG. 1, a flight control element 104 may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight.

In an embodiment, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Vehicle controller 108 may include and/or communicate with any computing device as described in this disclosure, including without limitation a microcontroller, microprocessor, digital signal processor (DSP) and/or system on a chip (SoC) as described in this disclosure. Further, vehicle controller 108 may include a single computing device operating independently, or may include two or more computing device operating in concert, in parallel, sequentially or the like; two or more computing devices may be included together in a single computing device or in two or more computing devices. In embodiments, vehicle controller 108 may be installed in an aircraft, may control the aircraft remotely, and/or may include an element installed in the aircraft and a remote element in communication therewith.

Vehicle controller 108 may include, be included in, and/or communicate with a mobile device such as a mobile telephone or smartphone. Further, vehicle controller 108 may communicate with one or more additional devices as described below in further detail via a network interface device. The network interface device may be utilized for commutatively connecting a vehicle controller 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

Vehicle controller 108 may include, but is not limited to, for example, a cluster of computing devices in a first location and a second computing device or cluster of computing devices in a second location. Vehicle controller 108 may include one or more computing devices dedicated to data storage, security, distribution of traffic for load balancing, and the like. Vehicle controller 108 may be configured to distribute one or more computing tasks as described below across a plurality of computing devices of computing device, which may operate in parallel, in series, redundantly, or in any other manner used for distribution of tasks or memory between computing devices. Vehicle controller 108 may also be implemented using a "shared nothing" architecture in which data is cached at the worker, in an embodiment, this may enable scalability of system 100 and/or computing device.

Still referring to FIG. 1, vehicle controller 108 may be communicatively connected to flight control elements 104A-N and sensor 112. As used herein, "communicatively connecting" is a process whereby one device, component, or circuit is able to receive data from and/or transmit data to another device, component, or circuit. A communicative connection may be achieved through wired or wireless electronic communication, either directly or by way of one or more intervening devices or components. Further, communicative connecting can include electrically coupling at least an output of one device, component, or circuit to at least an input of another device, component, or circuit. For example, via a bus or other facility for intercommunication between elements of a computing device as described in this disclosure. Communicative connecting may also include indirect connections via wireless connection, radio communication, low power wide area network, optical communication, magnetic, capacitive, or optical coupling, or the like.

Vehicle controller 108 may include any computing device or combination of computing devices as described in detail below in reference to FIG. 6. Vehicle controller 108 may include any processor or combination of processors as described below in reference to FIG. 6. Vehicle controller 108 may include a microcontroller. Vehicle controller 108 may be incorporated in an aircraft or may be in remote contact.

In an embodiment, and still referring to FIG. 1, vehicle controller 108 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Continuing to refer to FIG. 1, vehicle controller 108 may be designed and/or configured to perform any method, method step, or sequence of method steps in any embodiment described in this disclosure, in any order and with any degree of repetition. For instance, vehicle controller 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Vehicle controller 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in an embodiment where in-flight stabilization system 100 is incorporated into an electric aircraft, vehicle controller 108 may be programmed to operate an aircraft, including without limitation an electronic aircraft, to perform at a flight maneuver. A flight maneuver may include taxiing, takeoff, landing, stability control maneuvers, hovering, emergency response maneuvers, regulation of altitude, roll, pitch, yaw, speed, acceleration, or the like during any phase of flight. A flight maneuver may further include a flight plan or sequence of maneuvers to be performed during a flight plan. A flight maneuver can also include a change in altitude, change in speed, changed in travel direction, or the like. Further, a flight maneuver may include a landing, which may be a runway landing, defined herein as a landing in which a fixed-wing aircraft, or other aircraft that generates lift by moving a foil forward through air, flies forward toward a flat area of ground or water, alighting on the flat area and then moving forward until momentum is exhausted on wheels or (in the case of landing on water) pontoons. Momentum may be exhausted more rapidly by reverse thrust using propulsors 116, mechanical braking, electric braking, or the like. In an embodiment, a flight maneuver may include a vertical landing protocol, which may include a rotor-based landing such as one performed by rotorcraft such as helicopters or the like. In an embodiment, vertical takeoff and landing protocols may require greater expenditure of energy than runway-based landings. For example, vertical takeoff and landing protocols may, for instance, require substantial expenditure of energy to maintain a hover or near hover while descending or ascending, while the latter may require a net decrease in energy to approach or achieve stall. In an embodiment, vehicle controller 108 may be designed and configured to operate an aircraft via fly-by-wire. Vehicle controller 108 may enable fly-by-wire in response to an event or by the actions of others. In an embodiment, vehicle controller 108 may command an aircraft to operate via fly-by-wire when a failure of a component is detected.

Still referring to FIG. 1, sensor 112 can be communicatively connected to vehicle controller 108. Sensors, as described herein, are any device, module, and/or subsystems, utilizing any hardware, software, and/or any combination thereof to detect events and/or changes in the instant environment and communicate the information to the vehicle controller. Sensor 112 may be mechanically and/or communicatively coupled, as described above, to the aircraft. Sensor 112 may be configured to detect a failure event of a component of the aircraft. Sensors 112 may be used to monitor the status of the system of both critical and non-critical functions. Sensor 112 may be incorporated into vehicle or aircraft or be remote. As an example and without limitation, sensor 112 may be configured to detect the failure datum of a flight component of the aircraft. Failure datum may include, without limitation, an element of data identifying and/or describing a failure of at least a flight component has occurred. In an embodiment, sensor 112 detects the propulsor is not rotating at the speed which is necessary to maintain the flight plan. In another embodiment, sensor 112 may indicate that the energy source is not operating at the capacity necessary to maintain the flight plan. Sensor 112 is further configured to generate a failure datum of the flight component of an aircraft as a function of the failure event. Failure datum may include, as an example and without limitation, a determination that a propulsor is damaged or otherwise operating insufficiently, such as without limitation a determination that a propulsor such as a propeller is not generating torque, and/or that the propulsor and/or propeller is generating less torque than expected and/or necessary to produce a level of thrust required to maintain airspeed and/or lift. As a further example a degree of torque may be sensed, without limitation, using load sensors deployed at and/or around a propulsor and/or by measuring back electromotive force (back EMF) generated by a motor driving the propulsor.

Continuing to refer to FIG. 1, failure datum may include, without limitation, determination that one or more flight components 116 and/or systems for directional control, such as systems that enable an aircraft to maintain a heading, direct itself in a direction as indicated by a flight plan, and/or modify direction to perform one or more flight maneuvers as described above, is unable to function correctly. For instance, where steering is directed using rudders and/or ailerons, vehicle controller 108 may detect that one or more rudders and/or ailerons are failing to move as required to effect steering commands; detection may include, without limitation, detection that servomotors or other motors controlling motion of such components, are not functioning, using back EMF, unexpectedly high and/or low amounts of impedance, measures of torque, and/or power and/or current consumption or the like, as above for motors propelling one or more propulsors. Detection may include detection of motion and/or lack thereof of a component such as an aileron and/or rudder using sensor 112 that can detect motion. Detection of directional control failure, whether regulated by ailerons, rudders, and/or differential use of propulsors, may include a determination that expected shear stresses on the aircraft and/or one or more components thereof, as detected using load sensors, are less than they would be if the components were functioning correctly. Alternatively or additionally, detection may include detection that the aircraft is deviating from a route that would be expected if the steering components were functioning correctly.

Still referring to FIG. 1, failure datum may include determination that one or more power sources is losing capacity to provide sufficient power to at least a flight component; this may be determined based on any suitable measure of an energy source capacity and/or output. For instance, and without limitation, an output voltage of the energy source may reduce and/or collapse below a threshold level, a current output may reduce below a threshold level, and/or a detected internal resistance may increase unexpectedly. This may alternatively or additionally be detected by detection that one or more other flight components are consuming less power and/or producing less thrust, torque, force, or the like, which may indicate that less power is being provided to one or more components.

With continued reference to FIG. 1, flight component 116 may include power sources, control links to one or more elements, fuses, and/or mechanical couplings used to drive and/or control any other flight component. Flight component 116 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers (not shown) or other components for regulating motor speed, rotation direction, and/or dynamic braking.

Still referring to FIG. 1, flight component 116 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which in-flight system 100 may be incorporated.

In an embodiment, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source can include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Continuing to refer to FIG. 1, an energy source and/or motor may include or be commutatively connected to sensor 112 detecting one or more conditions of the energy source and/or motor. One or more conditions may include, without limitation, voltage levels, electromotive force, current levels, temperature, current speed of rotation, and the like. Sensors ma 112 can communicate a current status of an energy source to a person operating in-flight system 100 or a computing device. A computing device may include any computing device as described in this disclosure, including without limitation vehicle controller 108. Persons skilled in the art, upon reviewing the entirety of this disclosure, will be aware of various devices and/or components that may be used as or included at an energy source, a motor, and/or a circuit operating and/or connected thereto, as used and described herein.

Still referring to FIG. 1, sensor 112 may further include detecting electrical parameters. Electrical parameters may include, without limitation, voltage, current, ohmic resistance of a flight component. Sensor 112 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. At least a sensor 112 may include at least a geospatial sensor. Sensor 112 may be located inside an aircraft; and/or be included in and/or attached to at least a portion of the aircraft.

Continuing to refer to FIG. 1, vehicle controller 108 can be configured to generate mitigating response 120 to be performed by a flight control element 104A-N of plurality of flight control elements 104A-N. Mitigating response 120, as used in this disclosure, can include data indicating any corrective and/or preventative measure to be taken in order to permit and/or enable safe traveling of the aircraft. Mitigating response 120 may, as a non-limiting example, be designed to allow aircraft to land safely. In an embodiment, vehicle controller 108 may contain in its memory, and/or heuristic database one or more alternative control algorithms applicable to one or more scenarios, such as a first alternative control algorithm to maintain attitude when a single lift propulsor is compromised or non-functional, as second alternative control algorithm applicable where two lift propulsors have failed, or the like. Mitigating response 120 may include a switch from hovering and/or rotor-based flight to a fixed-wing flight, landing, and/or gliding descent. As another example and without limitation, where a pusher motor has failed, mitigating response 120 may include use of list propulsors to fly forward to a suitable landing site using differential torque for steering and/or forward propulsion. In an embodiment, mitigating response 120 may include, as a further non-limiting example, use of one or more lift propulsors in a free-wheeling fashion to generate lift and/or retard descent in a manner analogous to a rotor of an autogiro.

With continued reference to FIG. 1, as a non-limiting example provided for illustrative purposes only, mitigating response 120 may include pulsing torque on rotors to increase the average torque while minimizing the net thrust. Mitigating response 120 may include, as another example and without limitation, utilizing a pusher rotor to stabilize the aircraft. Alternatively, mitigating response 120 may include, as a non-limiting example, utilizing flight surfaces in a non-coordinated way for instance by using ailerons differentially, imposing additional drag with a segmented rudder, or the like. Mitigating response 120 may also include altering a flight path of the aircraft; this may include, without limitation, selection of an alternative landing site and/or procedure, modification of a flight route to avoid an obstacle, such as going around a high object rather than attempting to lift above it, selection of an emergency landing location and/or process, or the like. Flight navigation facilities such as GPS, maps data, or the like may be used for modifications to flight route.

Still referring to FIG. 1, heuristic database 124 may include a memory configured to store any data structure for ordered storage and retrieval of data, which may be implemented as a hardware or software module. Heuristic database 124 may be implemented, without limitation, as a relational database, a key-value retrieval datastore such as a NOSQL database, or any other format or structure for use as a datastore that a person skilled in the art would recognize as suitable upon review of the entirety of this disclosure. Heuristic database 124 may include input from experts, industry standards, and/or aviation databases as described in more detail below.

Continuing to refer to FIG. 1, system 100 includes a pilot interface device 128. "Pilot interface device", as used in this disclosure, is any device configured to display information to a pilot and/or user during a flight. For example and without limitation, pilot interface device 128 may include a primary flight display (PFD), multi-function display (MFD), heads-up display (HUD), holograph, projection, gauges, audio cues, video cues, data streams, displayed in a pilot's goggles or helmet, displayed to a third-party management device, and the like. The details of the display layout on a primary flight display can vary enormously, depending on the aircraft, the aircraft's manufacturer, the specific model of PFD, certain settings chosen by the pilot, and various internal options that are selected by the aircraft's owner (i.e., an airline, in the case of a large airliner). However, the great majority of PFDs follow a similar layout convention. As a further non-limiting example, pilot interface device 128 may include a multi-function display (MFD). An MFD may be a small-screen surrounded by configurable buttons that can be used to display information to the user in numerous configurable ways. An MFD and/or pilot interface device 128 may be configured to display any one or more elements of data as described in the entirety of this disclosure. Pilot interface device 128 may be configured to inform one or more systems of the aircraft bidirectionally connected thereto of any status datum as described in the entirety of this disclosure. For the purposes of this disclosure, "bidirectionally connected" is a communication arrangement wherein the connected systems, circuits, subsystems, computing devices, processors, chips, or any other combination of components may transmit data to and from the other. Bidirectional connection does limit the components to only two, and therefore any number of components may be connected to transmit and receive data from any and all of the other connected components. Bidirectional connection may be configured to transmit and receive one or more signals consistent with the description of any signal herein.

In an embodiment, pilot interface device 128 may be configured to receive the failure datum of a flight component of the aircraft from sensor 112. Further, in an embodiment, pilot interface device 128 may be configured to generate a response confirmation datum as a function of a pilot interaction. The "response confirmation datum", as used in the entirety of this disclosure is any element of data and/or signal describing confirmation by the pilot and/or user to perform the mitigating function. The "pilot interaction", as used in the entirety of this disclosure, is any interaction of the pilot and/or user with the pilot interface device. In an embodiment, for example and without limitation, the pilot interaction may include selecting an icon and/or visual display confirming the initiation of the mitigating response. For example and without limitation, generating the response confirmation datum as a function of the pilot interaction may include the pilot selecting the mitigating response on the MFD. As a further example and without limitation, generating the response confirmation datum as a function of the pilot interaction may include a user selecting the mitigating response on a third-party fleet management computing device. Persons skilled in the art, upon reviewing the entirety of this disclosure, will be aware of various ways in which a pilot and/or user will interact with the pilot interface device and generate the response confirmation datum consistently with this disclosure.

Figure 2:
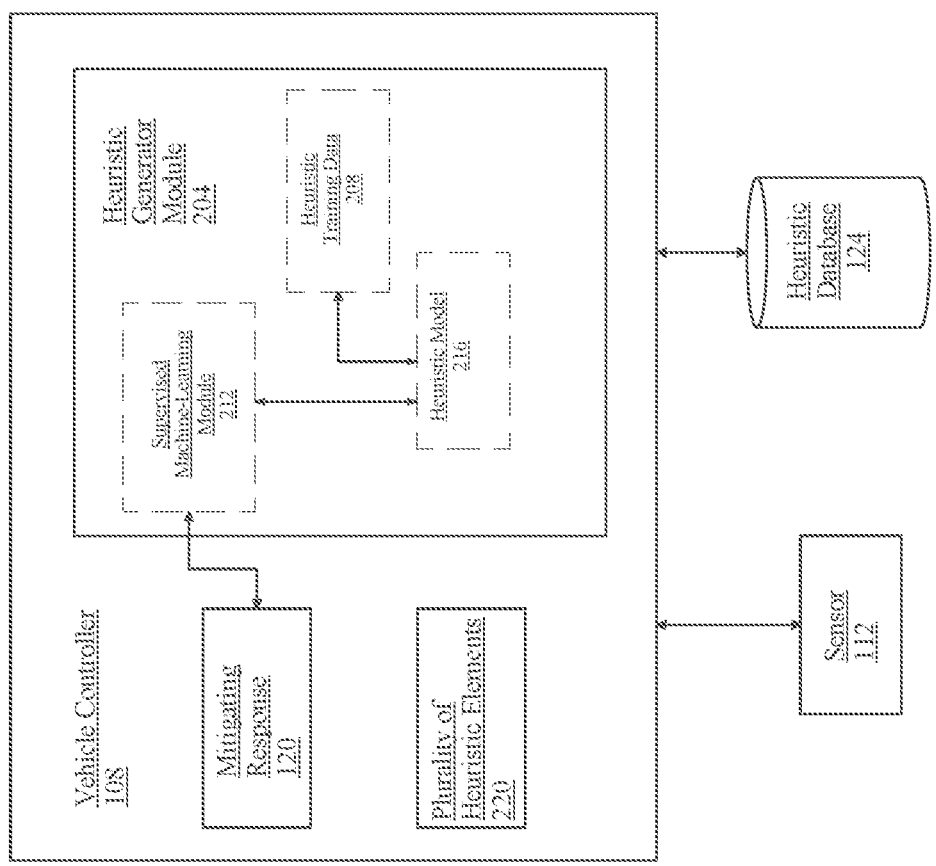
FIG. 2 is a block diagram illustrating an embodiment of a vehicle controller.

Referring now to FIG. 2, an embodiment 200 of vehicle controller 108 is illustrated. Vehicle controller 108 comprises heuristic generator module 204. Heuristic generator module 204 may be implemented as a hardware or software module, such as a microcontroller, microprocessor, digital signal processor (DSP), system on a chip (SoC), graphics processing unit (GPU), central processing unit (CPU), processor, controller or any combination thereof, as described herein. Heuristic generator module 204 is configured to receive heuristic training data 208 from heuristic database 124 correlating a failure datum to at least a heuristic element. Heuristic generator module 204 is further configured to generate, using supervised machine-learning module 212, a heuristic model 216 that receives the failure datum as an input and produces an output containing a plurality of heuristic elements 220. Vehicle controller 108 is further configured to receive the plurality of heuristic elements 220 generated at the heuristic generator module 204 and generate the mitigating response 120 as a function of the heuristic element 220.

With continued reference to FIG. 2, heuristic generator module 204 is configured to receive heuristic training data 208 from heuristic database 124 correlating a failure datum to at least a heuristic element. "Training data," as used in this disclosure, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations. For example, correlations may indicate causative and/or predictive links between categories of data elements, which may be modeled as relationships such as mathematical relationships by machine-learning processes as described in further detail below. In an embodiment, training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 2, training data may include one or more elements that are not categorized, that is to say, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by vehicle controller 108 may correlate any input data as described in this disclosure to any output data as described in this disclosure.

Still referring to FIG. 2, vehicle controller 108 and/or an additional computing device may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Further, linear regression models may include least absolute shrinkage and selection operator (LASSO) models, in which ridge regression is combined with multiplying the least-squares term by a factor of 1 divided by double the number of samples. Linear regression models may also include a multi-task lasso model wherein the norm applied in the least-squares term of the lasso model is the Frobenius norm amounting to the square root of the sum of squares of all terms. Additionally, linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 2, heuristic generator module 108 can receive heuristic training data 208 correlating a failure datum to at least a heuristic element 220. "Correlation" in a training data set may include any relation established therein linking one datum to another, including inclusion together in a data element, row, column, cell, or the like, and/or by giving each a common indicator and/or label indicative of their correlation in data used to create and/or compile training data. Correlation may include a relation established whereby at least an element of failure datum is correlated to at least a heuristic element based on data entries obtained from the same subject. Training set may include a plurality of entries, each entry correlating at least an element of failure datum to at least a heuristic element. Heuristic training data 208 can be received from a heuristic database 124. A "heuristic element" as used in this disclosure, includes any data that contains an algorithm and/or heuristic that responds to the failure datum to minimize the negative implications of the failure datum and aim to provide the highest degree of safety. Heuristic elements may include, for example and without limitation, algorithms and/or machine-learning processes that may adjust the flight plan of the aircraft to promote the greatest overall safety and minimal damage of the aircraft; such as switching from rotor-based flight to fixed-wing flight during landing and/or determining a closer landing area. Heuristic elements may include, as a further example and without limitation, algorithms and/or machine learning processes that may mitigate power to components of the aircraft by determining the greatest need and/or importance, such as dimming the lights to properly allocate power to vital flight components. Persons skilled in the art, upon reviewing the entirety of this disclosure, will be aware of various processes that may be used as heuristic elements consistently with this disclosure.

With continued reference to FIG. 2, heuristic generator module 204 can receive heuristic training data 208 from a heuristic database 124 correlating the failure datum to at least a heuristic element. Heuristic generator module 204 may receive heuristic training data 208 containing at least a failure datum that matches the failure datum received from sensor 112. For instance and without limitation, heuristic generator module 204 may receive heuristic training data 208 correlating decreasing speed to at least a heuristic element which may match a failure datum received from a sensor containing decreased rotations per second of the rotor. In yet another non-limiting example, heuristic generator module 204 may receive heuristic training data 208 correlating a deviation of the flight plan to at least a heuristic element which may match a failure datum received from sensor containing navigational data not matching the current path of flight. Heuristic generator module 204 may receive at least a failure datum containing a component classifier wherein the component classifier includes a component descriptor and receives heuristic training data 208 from a heuristic database 124 as a function of the at least a component descriptor. Component classifier may indicate a particular aircraft region, aircraft component, and/or aircraft system impacted by particular component failure. For instance and without limitation, failure datum such as vehicle controller malfunction may contain a component classifier that includes the flight control area. In yet another non-limiting example, failure datum such as rotor failure may contain a component classifier that includes affected aircraft system indicating the rotor-based flight system. Component descriptor includes an indication describing the extent to which a particular component failure has progressed. For instance and without limitation, failure datum such as engine failure may include a stage two component descriptor when two or more components will be affected by the failure. In yet another non-limiting example, failure datum such as aerodynamic spin may include a stage one component descriptor if the spin is imminent and has not already occurred. Heuristic generator module 204 receives heuristic training data 208 from heuristic database 124 as a function of at least a component descriptor. For instance and without limitation, heuristic generator module 204 may receive heuristic training data 208 correlating stage three aerodynamic stall to at least a heuristic element which may match a failure datum containing a disease stage descriptor received from a flight safety repository containing stage three aerodynamic stall. Persons skilled in the art, upon reviewing the entirety of this disclosure, will be aware of various data that may be used as heuristic training data consistently with this disclosure. Heuristic database 124 may contain tables organizing heuristic training data 208 by component type, component and/or failure classifier, and/or component and/or failure descriptor as described in more detail below.

With continued reference to FIG. 2, heuristic generator module 204 is configured to generate, using supervised machine-learning process 212, heuristic model 216. Heuristic generator model 204 can be configured to receive the failure datum as an input and produces an output containing a plurality of heuristic elements 220. Supervised machine-learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use elements of failure datum as inputs, heuristic elements as outputs and a scoring function representing a desired form of relationship to be detected between elements of failure datum and heuristic elements 220. Scoring function may, for instance, seek to maximize the probability that a given element of failure datum and/or combination of elements of failure datum is associated with a given heuristic element and/or combination of heuristic elements to minimize the probability that a given element of failure datum and/or combination of elements of failure datum is not associated with a given heuristic element and/or combination of heuristic elements. Scoring function may be expressed as a risk function representing an "expected loss" of an algorithm relating inputs to outputs, where loss is computed as an error function representing a degree to which a prediction generated by the relation is incorrect when compared to a given input-output pair provided in a training set. Persons skilled in the art, upon reviewing the entirety of this disclosure, will be aware of various possible variations of supervised machine-learning algorithms that may be used to determine relation between elements of failure datum and heuristic elements. In an embodiment, one or more supervised machine-learning algorithms may be restricted to a particular domain for instance, a supervised machine-learning process may be performed with respect to a given set of parameters and/or categories of parameters that have been suspected to be related to a given set of failure datum, and/or are specified as linked to an aircraft component and/or aircraft system covering a particular set of failure datum. As a non-limiting example, a particular set of current and/or voltage data received from a sensor may be typically used by pilots and/or aircraft flight crew to infer or predict various engine failures, and a supervised machine-learning process may be performed to relate those current and/or voltage data received from a sensor to the various heuristic elements. In an embodiment, domain restrictions of supervised machine-learning procedures may improve accuracy of resulting models by ignoring artifacts in training data. Domain restrictions may be suggested by experts and/or deduced from known purposes for particular evaluations and/or known tests used to evaluate failure datum. Additional supervised learning processes may be performed without domain restrictions to detect, for instance, previously unknown and/or unsuspected relationships between failure datum and heuristic elements.

Still referring to FIG. 2, heuristic generator module 204 can be configured to generate, using a supervised machine-learning process heuristic model 216 that outputs a plurality of heuristic elements 220. Supervised machine-learning processes may include classification algorithms, defined as processes whereby a computing device derives, from training data, a model for sorting inputs into categories or bins of data. Classification may be performed using, without limitation, linear classifiers such as without limitation logistic regression and/or naive Bayes classifiers, nearest neighbor classifiers, support vector machines, decision trees, boosted trees, random forest classifiers, and/or neural network-based classifiers.

Still referring to FIG. 2, machine-learning processes as described in this disclosure may be used to generate machine-learning models. A "machine-learning model," as used in this disclosure, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning, for instance for multi-layered networks.

Still referring to FIG. 2, generating mitigating response 120 as a function of the plurality of heuristic elements 220 further comprises generating a loss function of the failure datum and the at least a heuristic element 220, minimizing the loss function, and selecting at least a heuristic element 220 as a function of minimizing the loss function. Generating loss function includes evaluating at least a heuristic element wherein the heuristic element contains a numerical scored response, assigning a weighted variable to the at least a heuristic element as a function of the implementation factor and minimize the loss function as a function of the weighted variable. An "implementation factor" as used in this disclosure, includes a numerical score reflecting the importance of a heuristic element as compared to other heuristic elements of the plurality of heuristic elements 220. A numerical score that contains a higher number may indicate a higher level of importance of a given implementation factor. A numerical scored response may be generated by a user, a machine-learning process, a simulation, and the like. The numerical score may reflect the importance of a heuristic element to a particular component. For instance and without limitation, a system may score an implementation factor such as loss of hovering capability as being more important than the loss of interior lighting because the lighting does not result in detrimental negative implications for aircraft and/or payload safety. In yet another non-limiting example, a system may score a heuristic element such as relocating the aircraft landing area more important over maintaining rotor-based flight while landing due to the importance of minimizing risk to the aircraft and aircraft contents. A weighted variable may be assigned to a heuristic element as a function of the implementation factor. A "weighted variable" as used in this disclosure, includes a value or weight for each observation in a heuristic element. In an embodiment, a heuristic element that has a larger weighted variable may have more influence as compared to a user implementation response that has a smaller weighted variable response. Generating the mitigating response 120 minimizes the loss function as a function of the weighted variable. Generating the mitigating response 120 may classify the heuristic element as a function of the numerical scored response. Classification may include sorting the heuristic elements 220 into particular categories containing shared characteristics as a function of the implementation factor containing a numerical scored response. Categories may include "optimal" for those implementation factors containing the highest numerical scored response. Categories may include "average" for those implementation factors containing an average numerical scored response. Categories may include "low" for those implementation factors containing a low numerical scored response. In an embodiment, generating the mitigating response 120 may be programed to know what numerical score ranges may fit within each defined category. Generating the mitigating response 120 may generate a classification label indicating a user implementation optimization factor as a function of the numerical scored response. Classification label may include data describing which category a particular heuristic element belongs to. Classification label may be generated utilizing a supervised machine-learning model that may be trained to match an input a particular category and classify it. Classification may be performed utilizing classification algorithms that include for example logistic regression, naïve bayes classifier, k-nearest neighbor, support vector machines, decision trees, boosted trees, random forest, and/or neural networks. Generating the mitigating response 120 selects at least a heuristic element containing an "optimal" classification label and minimizes the total variance from the at least a heuristic element containing an optimal classification label.

Figure 3:
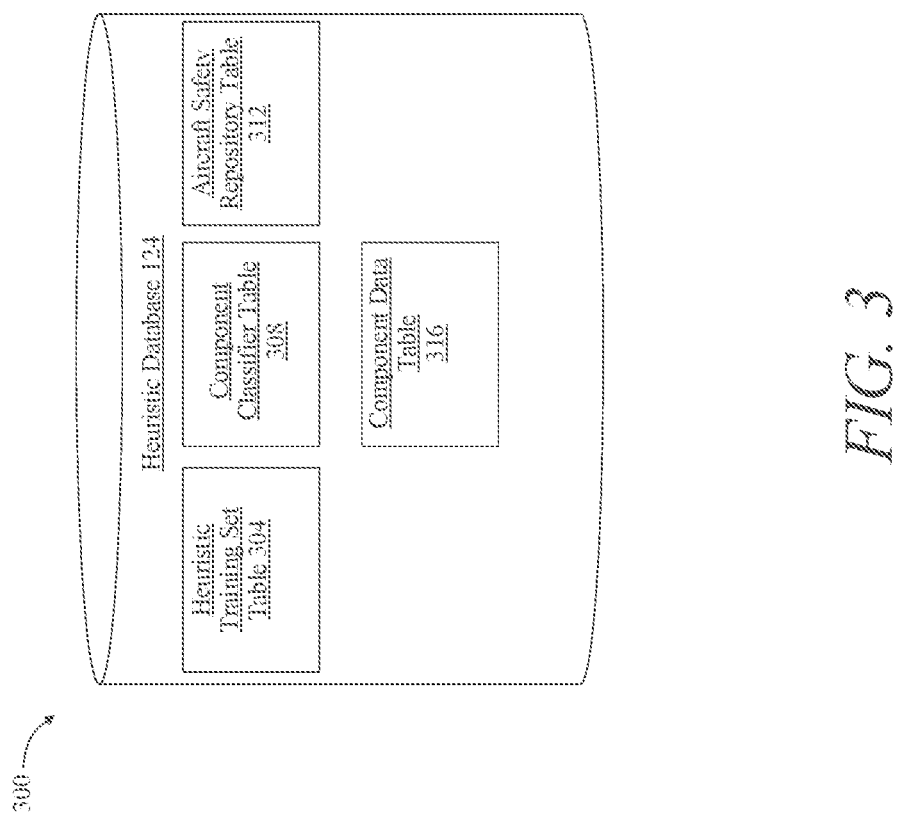
FIG. 3 is a schematic representation illustrating an embodiment of a heuristic database.

Referring now to FIG. 3, an embodiment 300 of heuristic database 124 is illustrated. Heuristic database 124 may organize data stored in heuristic database 124 according to one or more database tables. One or more database tables may be linked to one another by, for instance, common column values. For instance, a common column between two tables may include an identifier of a failure datum, which may be linked to a component classifier. Persons skilled in the art, upon reviewing the entirety of this disclosure, will be ware of various ways in which one or more database tables may be linked to one another.

With continued reference to FIG. 3, one or more tables contained within heuristic database 124 may include heuristic training set table 304. Heuristic training set table 304 may include one or more entries containing heuristic training sets organized by failure datum. For instance and without limitation, heuristic training set table 304 may include a first entry containing a heuristic training set organized by failure datum such as energy source depletion and a second entry containing a heuristic training set organized by failure datum such as motor malfunction. One or more tables contained within heuristic database 124 may include component classifier table 308. Component classifier table 308 may include one or more entries containing heuristic training sets organized by component classifiers. For instance and without limitation, component classifier table 308 may include a first entry containing a heuristic training set pertaining to rotor failure of located on the $2^{nd}$ rotor on the left airfoil and a second entry containing a heuristic training set pertaining to energy source depletion affecting the first battery of a module of batteries connected in series. One or more tables contained within heuristic database 124 may include aircraft safety repository table 312. Aircraft safety repository table 312 may include one or more entries containing data from aviation networks, aviation safety organizations and/or accident databases organized by component classifiers. For instance and without limitation, data from aviation networks, aviation safety organizations and/or accident databases organized by component classifiers may include data from Aviation Safety Network (ASN) databases, Aviation Safety Reporting System, National Transportation Safety Board (NTSB) Aviation Accident Database, and the like. One or more tables contained within heuristic database 124 may include component data table 316. Component table 316 may include one or more entries containing data collected from aviation databases organized by flight component. For instance and without limitation, data from aviation databases such as Federal Aviation Administration (FAA) databases, detailed aircraft information database, aircraft characteristics databases, aircraft technical data, and the like. Persons skilled in the art, upon reviewing the entirety of this disclosure, will be aware of various additional methods whereby novel terms may be separated from already-classified terms and/or synonyms therefore, as consistent with this disclosure.

Figure 4:
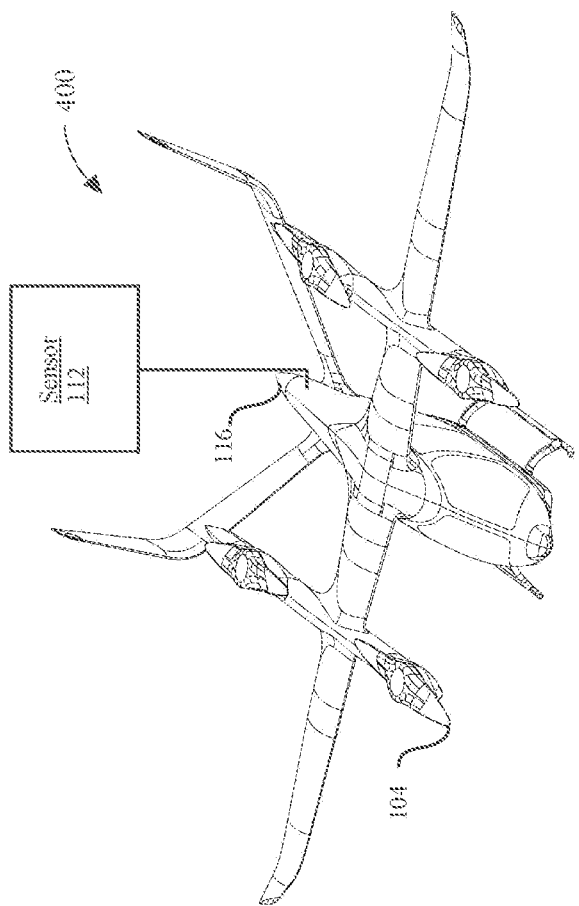
FIG. 4 is a diagrammatic representation of an electric aircraft.

Referring now to FIG. 4, in-flight system 100 may be incorporated into an electrically powered aircraft 400. In embodiments, electrically powered aircraft 400 may be an electric vertical takeoff and landing (eVTOL) aircraft. Electrically powered aircraft 400 may include flight control elements 104A-N each communicatively and/or mechanically flight control element 104A-N vehicle controller 108. A flight control element includes any flight control element as described above in reference to FIGS. 1-3. Electric aircraft 400 may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 4, an illustration of forces is illustrated in an electric aircraft. During flight, a number of forces may act upon the electric aircraft. Forces acting on an aircraft 400 during flight may include thrust, the forward force produced by the rotating element of the aircraft 400 and acts parallel to the longitudinal axis. Drag may be defined as a rearward retarding force which is caused by disruption of airflow by any protruding surface of the aircraft 400 such as, without limitation, the wing, rotor, and fuselage. Drag may oppose thrust and acts rearward parallel to the relative wind. Another force acting on aircraft 400 may include weight, which may include a combined load of the aircraft 400 itself, crew, baggage and fuel. Weight may pull aircraft 400 downward due to the force of gravity. An additional force acting on aircraft 400 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 5:
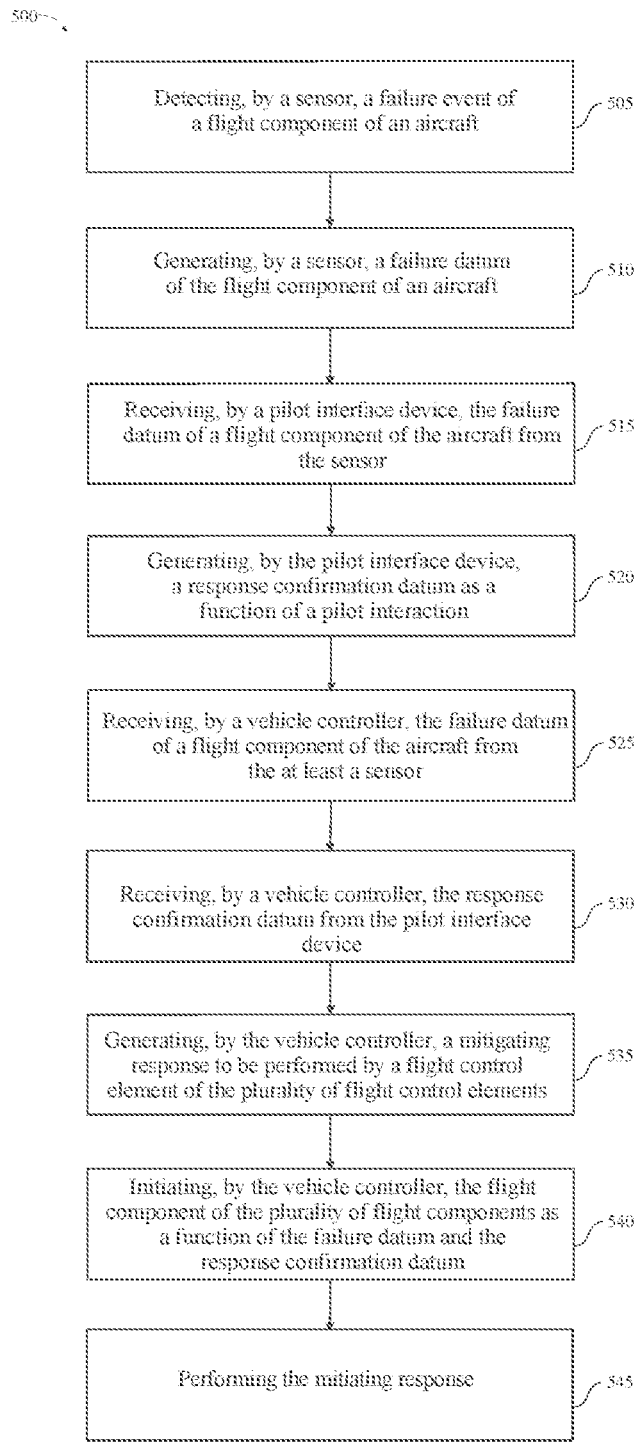
FIG. 5 is a flow diagram illustrating a method of in-flight stabilization.

Now referring to FIG. 5, a flow diagram illustrating a method 500 of in-flight stabilization system is shown. At step 505, sensor 112 detects a failure event of a flight component 116 and outputs the failure datum of a flight component 116 of an aircraft. Detecting, as described herein, may include reading parameters and/or receiving data from flight component 116 indicating a failure. A failure event may include any failure event as described above, including an element of data identifying a failure of at least a flight component has occurred. At step 510, sensor 112 generates a failure datum of a flight component of an aircraft. A failure datum may include any failure datum as described above, including an element of data describing a failure of at least a flight component has occurred. The failure datum may be detected, for instance, using any means or method as described above, including using sensor 112 and/or via a mechanically and/or communicative connection between vehicle controller 108 and a flight component 116. As an example and without limitation, failure datum may determine that the propulsor is not rotating at the speed which is necessary to maintain the flight plan. In another embodiment, sensor 112 connected to flight component 116 may indicate that the energy source is not operating at the capacity necessary to maintain the flight plan. Failure datum may include, without limitation, a determination that a propulsor is damaged or otherwise operating insufficiently, such as without limitation a determination that a propulsor such as a propeller is not generating torque, and/or that the propulsor and/or propeller is generating less torque than expected and/or necessary to produce a level of thrust required to maintain airspeed and/or lift; a degree of torque may be sensed, without limitation, using load sensors deployed at and/or around a propulsor and/or by measuring back electromotive force (back EMF) generated by a motor driving the propulsor. Additionally, failure datum may include, without limitation, determination that one or more components and/or systems for directional control, such as systems that enable an aircraft to maintain a heading, direct itself in a direction as indicated by a flight plan, and/or modify direction to perform one or more flight maneuvers as described above, is unable to function correctly. For instance and without limitation, where steering is directed using rudders and/or ailerons, vehicle controller 108 may detect that one or more rudders and/or ailerons are failing to move as required to effect steering commands. Further, failure datum may include, without limitation, detection that servomotors or other motors controlling motion of such components, are not functioning, using back EMF, unexpectedly high and/or low amounts of impedance, measures of torque, and/or power and/or current consumption or the like, as above for motors propelling one or more propulsors. Failure datum may also include detection of motion and/or lack thereof of a component such as an aileron and/or rudder using sensors that can detect motion. Failure datum, whether regulated by ailerons, rudders, and/or differential use of propulsors, may include a determination that expected shear stresses on aircraft 400 and/or one or more components thereof, as detected using load sensors, are less than they would be if the components were functioning correctly. Alternatively or additionally, failure datum may include detection that aircraft 400 is deviating from a route that would be expected if the steering components were functioning correctly.

Still referring to FIG. 5, failure datum may include determination that one or more power sources is losing capacity to provide sufficient power to at least a flight component; this may be determined based on any suitable measure of energy source capacity and/or output. For instance, and without limitation, an output voltage of an energy source may reduce and/or collapse below a threshold level, a current output may reduce below a threshold level, and/or a detected internal resistance may increase unexpectedly. This may alternatively or additionally be failure datum, wherein one or more other flight components are consuming less power and/or producing less thrust, torque, force, or the like, which may indicate that less power is being provided to one or more components. A flight component 116 may include any flight component as described above in reference to FIGS. 1-4. A flight component may further include, without limitation, a propulsor, a motor, a rudder, and the like. Persons skilled in the art, upon reviewing the entirety of this disclosure, will be aware of various failure datums, and techniques for detecting such datums, consistent with this disclosure.

With continued reference to FIG. 5, at step 515, pilot interface device 128 receives a failure datum relating to a flight component 116 from sensor 112. The failure datum includes any failure datum as described above in reference to FIGS. 1-4. The pilot interface device may include any pilot interface device as described above in further detail in reference to FIGS. 1-4. Persons skilled in the art, upon reviewing the entirety of this disclosure, will be aware of various devices which may be used as a pilot interface device consistently with this disclosure.

Still referring to FIG. 5, at step 520, pilot interface device 128 generates a response confirmation datum as a function of a pilot interaction. The response confirmation datum may include any response confirmation datum as described above in further detail in reference to FIGS. 1-4. The pilot interaction may include any pilot interaction as described above in further detail in reference to FIGS. 1-4. Generating the response confirmation datum may include any means and/or method of generation as described in the entirety of this disclosure. In an embodiment, for example and without limitation, the pilot interaction may include selecting an icon and/or visual display confirming the initiation of the mitigating response. For example and without limitation, generating the response confirmation datum as a function of the pilot interaction may include the pilot selecting the mitigating response on the MFD. As a further example and without limitation, generating the response confirmation datum as a function of the pilot interaction may include a user selecting the mitigating response on a third-party fleet management computing device. Persons skilled in the art, upon reviewing the entirety of this disclosure, will be aware of various ways in which a pilot and/or user will interact with the pilot interface device and generate the response confirmation datum consistently with this disclosure.

Continuing to refer to FIG. 5, at step 525, vehicle controller 108 receives a failure datum relating to a flight component 116 from the sensor 112. The failure datum includes any failure datum as described above in reference to FIGS. 1-4. Vehicle controller 108 may determine if the failure datum of at least a flight component 116 sufficiently serve to compromise flight. This may include a determination that a detected failure is actually or potentially a catastrophic failure. Catastrophic failures may include loss of steering, loss of power, loss of any function of the aircraft 400 which will immediately or in a short time cause the aircraft 400 to enter into a situation where it is almost certain that it will crash and cause a loss of life, cargo and integrity of the aircraft. Examples of catastrophic failures may include, without limitation, loss of propulsor, loss of energy or power, loss of rudder function, and the like.

Still referring to FIG. 5, at step 530, vehicle controller 108 receives the response confirmation datum from pilot interface device 128. The response confirmation datum includes any response confirmation as described above in reference to FIGS. 1-4. Pilot interface device 128 may include any pilot interface device as described in further detail in the entirety of this disclosure. Receiving the response confirmation datum includes any method and/or means of receiving as described in further detail above in reference to FIGS. 1-4.

With continued reference to FIG. 5, at step 535, vehicle controller 108 generates a mitigating response to be performed by a flight control element 104A-N of the plurality of flight control elements 104A-N. Mitigating response may, as a non-limiting example, be designed to allow aircraft 400 to land safely. Mitigating response, may include without limitation, any mitigating response as described above in reference to FIGS. 1-4. In an embodiment, mitigating response may contain one or more alternative control algorithms applicable to one or more scenarios, such as a first alternative control algorithm to maintain attitude when a single lift propulsor is compromised or non-functional, as second alternative control algorithm applicable where two lift propulsors have failed, or the like. A mitigating response may include a switch from hovering and/or rotor-based flight to a fixed-wing flight, landing, and/or gliding descent; likewise, where a pusher motor has failed, a mitigating response may include use of list propulsors to fly forward to a suitable landing site using differential torque for steering and/or forward propulsion. A mitigating response may include use of one or more lift propulsors in a free-wheeling fashion to generate lift and/or retard descent in a manner analogous to a rotor of an autogiro.

In an embodiment, and still referring to FIG. 5, generating a mitigating response may include receiving, by heuristic generator module 204, heuristic training data 208 from heuristic database 124 correlating a failure datum to at least a heuristic element and generating, by the heuristic generator module 204 using a supervised machine-learning process, a heuristic model 216 that receives failure datum as an input and produces an output containing a plurality of heuristic elements 220. Alternatively or additionally, a heuristic element may be identified using a model and/or heuristic that weighs multiple detected factors and selects a heuristic element as a result. Heuristic and/or model may be generated by vehicle controller 108 and/or another computing device using methods including without limitation machine-learning processes. A machine learning process is a process that automatedly uses a body of data known as "training data" and/or a "training set" to generate an algorithm that will be performed by a computing device/module to produce outputs given data provided as inputs, as described in further detail above in reference to FIGS. 1-3.

Still referring to FIG. 5, vehicle controller 108 may perform one or more machine-learning processes as described above in reference to FIGS. 1-4 on vehicle controller 108. Alternatively or additionally, vehicle controller 108 may receive a machine-learning model and/or heuristic derived from a machine-learning model from another computing device. Receiving machine-learning model and/or heuristic may include, without limitation, reconfiguration of a reconfigurable circuit as described above to enact and/or perform the machine-learning model and/or heuristic. Alternatively or additionally, machine-learning model and/or heuristic may be stored in memory of vehicle controller 108 and/or heuristic database 124.

In an embodiment, and still referring to FIG. 5, one or more mitigating responses, including without limitation one or more alternative control algorithms as described above, may be generated using machine learning and/or neural net training algorithms as described above. For instance, and without limitation, training data may be assembled including entries correlating sensor data sets, flight maneuver actions, and outcomes. As a non-limiting example, a set of flight maneuver options, including without limitation exemplary options as described below, such as patterns of power (increased, decreased, pulsed) provided to one or more functioning propulsors, steering using rudders, ailerons, or the like, may have labels and/or values associated with each item; these may be correlated in a training data element with a set of sensor data input values corresponding to a circumstance under which sets and/or sequences of flight maneuver options may have succeeded in preventing damage or loss of life, or may have succeeded in maintaining control of an aircraft. Machine-learning algorithms and/or neural net algorithms may be used as described above to determine combinations and/or sequences of flight maneuvers that are effective given combinations and/or sequences of sensor input.

With continued reference to FIG. 5, generating a mitigating response further comprises vehicle controller 108 receiving the plurality of heuristic elements 220 generated by the heuristic generator module 204, and generating the mitigating response as a function of the at least a heuristic element. The heuristic element may include any heuristic element as described above in reference to FIGS. 1-4. Generating the mitigating response as a function of the plurality of heuristic elements 220 further includes generating a loss function as a function of the failure datum and the at least a heuristic element. Vehicle controller 108 generates a loss function utilizing any of the methods as described above in reference to FIGS. 1-4.

Still referring to FIG. 5, generating the mitigating response as a function of the plurality of heuristic elements 220 further includes minimizing the loss function. Vehicle controller 108 may minimize the loss function by selecting a heuristic element with a small variable that may minimize the loss function. Vehicle controller 108 is further configured to generate the mitigating response by selecting at least a heuristic element as a function of minimizing the loss function. Vehicle controller 108 may utilize the selected mitigating response containing a small value variable to minimize a heuristic element containing a large variable or weight. Mitigating responses containing large variables or weight may be classified to contain optimal classification labels.

With continued reference to FIG. 5, vehicle controller 108 may attempt various categories and/or examples of maneuver techniques and/or mitigating responses as described above. Selection and/or attempt of mitigation responses may be performed, without limitation, using a calculation loop involving internal, external and environmental sensors datum into vehicle controller 108 to calculate the most probable flight plan and maneuver to ensure safe and efficient landing. Artificial intelligence and simulation offer the ability to find a "least wrong" or best-match answer and/or to add dimensions of non-linear thrust to a mitigating response and/or solution via approximation using, e.g., regression and therefore stabilize the aircraft, possibly with some motion, while the aircraft is safely returned to the ground. As a non-limiting example provided for illustrative purposes only, mitigating response may include pulsing torque on rotors to increase the average torque while minimizing the net thrust. Mitigating response may include utilizing a pusher rotor to stabilize the aircraft. Mitigating response may include utilizing flight surfaces in a non-coordinated way for instance by using ailerons differentially, imposing additional drag with a segmented rudder, or the like. Mitigating response may include altering a flight path of the aircraft; this may include, without limitation, selection of an alternative landing site and/or procedure, modification of a flight route to avoid an obstacle, such as going around a high object rather than attempting to lift above it, selection of an emergency landing location and/or process, or the like. Flight navigation facilities such as GPS, maps data, or the like may be used for modifications to flight route.

For instance, and without limitation, vehicle controller 108 May store storing the plurality of heuristic elements 220, the mitigating response 120, and the failure datum in heuristic database 124. At least a heuristic database, as described herein, includes any heuristic database 124, as described above in further detail in reference to FIGS. 1-3. Datasets contained within heuristic database 124 may be categorized and/or organized by any of the methodologies as described above in reference to FIG. 1 and FIG. 3. Storing the plurality of heuristic elements 220, the mitigating response 120, and the failure datum in heuristic database 124 in heuristic database 124 may include any method and/or combination of methods of storing as described above in reference to FIGS. 1-4.

Continuing to refer to FIG. 5, at step 540, vehicle controller 108 may initiate a flight component 104. Initiating may include, without limitation, any means and/or combination of means of initiation as described above in reference to FIGS. 1-4. At step 545, initiating the flight component 104 further includes performing the mitigating response. Performing the mitigating response may include any means and/or combination of means of performing as described above in reference to FIGS. 1-4. The mitigating response, as described herein, includes any mitigating response as described in the entirety of this disclosure. Performing a mitigating response may include, as an example and without limitation, a flight maneuver, such as pulsing a propulsor of a plurality of propulsors, wherein a vehicle controller may execute a command to allow an energy source to send energy to a motor in order to pulse the propulsor. Pulsing may keep the propulsor working in order to maintain thrust and keep the aircraft in-flight. A flight maneuver may further include, as a non-limiting example, utilizing a rudder to guide the aircraft to a specific location. As another example and without limitation, performing a mitigating response may include utilizing a pusher rotor to stabilize the aircraft 40.0 As another example and without limitation, performing a mitigating response may include utilizing at least a flight component 104 surface in a non-coordinated way. flight control element 104A-N.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
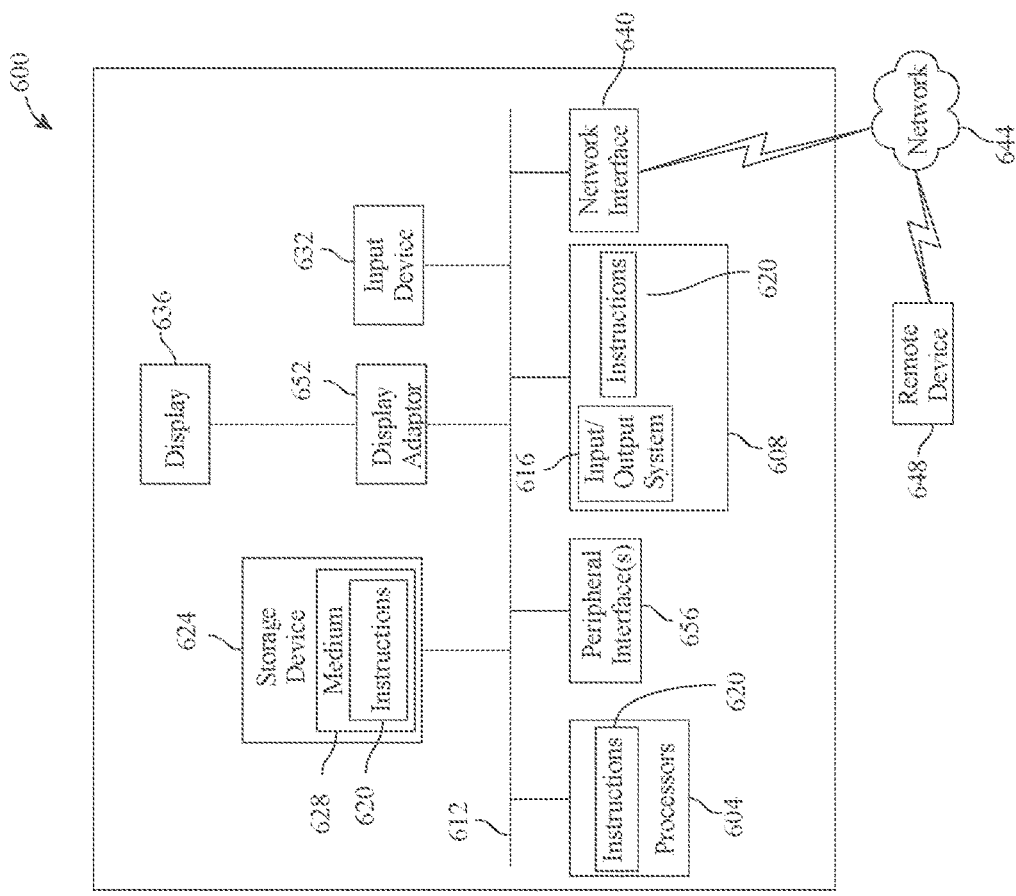
FIG. 6 is a block diagram of a computing system that can be used to implement any one or more of the methodologies disclosed herein and any one or more portions thereof.

Referring now to FIG. 6, shown is a diagrammatic representation of one embodiment of a computing device in the exemplary form of a computer system 600 within which a set of instructions for causing a control system, such as the in-flight stabilization system 100 of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 694 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656.

Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for in-flight stabilization, the system comprising:
   a plurality of flight components mechanically coupled to an aircraft;
   a sensor mechanically coupled to the aircraft, wherein the sensor is configured to:
     detect a failure event associated with the aircraft; and
     generate a failure datum based on the failure event, wherein the failure datum contains a component classifier representing a flight component of the plurality of flight components that is affected by the failure event and a component descriptor representing an extent of progression of the failure event;
   a pilot interface device mechanically coupled to the aircraft, wherein the pilot interface device is configured to:
     present a mitigating response representing an adjustment in a flight path of the aircraft;
     receive a user selection of the mitigating response; and
     generate a response confirmation datum based on the user selection; and
   a vehicle controller communicatively connected to the sensor, the vehicle controller configured to:
     receive the failure datum from the sensor;
     receive the response confirmation datum from the pilot interface device;
     generate the mitigating response based on the component classifier and the component descriptor; and
     based on receiving the failure datum and the response confirmation datum, cause the plurality of flight components to adjust the flight path based on the mitigating response.

2. The system of claim 1, wherein the aircraft further comprises an electric aircraft.

3. The system of claim 1, wherein the plurality of flight components includes a propulsor.

4. The system of claim 1, wherein the vehicle controller is further communicatively coupled to each flight component of the plurality of flight components and the flight component.

5. The system of claim 1, wherein the vehicle controller further comprises a reconfigurable hardware platform.

6. The system of claim 1, wherein the pilot interface device is further configured to display the mitigating response to be performed by at least one of the plurality of flight components.

7. The system of claim 1, wherein the vehicle controller further configured to:
   receive heuristic training data from a database correlating the failure datum to at least one heuristic element from a plurality of heuristic elements; and
   generate, using a supervised machine-learning process, a heuristic model that receives the failure datum as an input and produces an output containing the at least one heuristic element.

8. The system of claim 1, wherein the vehicle controller is further configured to generate the mitigating response by:
   receiving a plurality of heuristic elements; and
   generating the mitigating response based on the plurality of heuristic elements.

9. The system of claim 8, wherein generating the mitigating response based on the plurality of heuristic elements is further configured to:
   generate a loss function based on the failure datum and the plurality of heuristic elements;
   minimize the loss function; and
   select at least one of the plurality of heuristic elements based on the loss function.

10. The system of claim 1, wherein the vehicle controller is further configured to:
    store the failure datum in a heuristic database;
    store a plurality of heuristic elements in the heuristic database; and
    store the mitigating response in the heuristic database.

11. The system of claim 1, wherein performing the mitigating response further comprises:
    pulsing a torque associated with one or more rotors of the aircraft to increase an average torque while minimizing a net thrust;
    utilizing a pusher rotor to stabilize the aircraft;
    utilizing one or more flight surfaces associated with the aircraft in a non-coordinated way; and
    altering a flight path of the aircraft.

12. A method for in-flight stabilization, the method comprising:
    detecting, by a sensor, a failure event associated with an aircraft;
    generating, by a sensor and based on the failure event, a failure datum, wherein the failure datum contains a component classifier representing a component of a plurality of flight components of the aircraft that is affected by the failure event and a component descriptor representing an extent of progression of the failure event;
    presenting, by a pilot interface device, a mitigating response, wherein the mitigating response represents an adjustment in a flight path of the aircraft;
    receiving, by the pilot interface device, a user selection of the mitigating response;
    generating, by the pilot interface device, a response confirmation datum based on the user selection;
    receiving, by a vehicle controller, the failure datum;

receiving, by the vehicle controller, the response confirmation datum from the pilot interface device;

generating, by the vehicle controller, the mitigating response based on the component classifier and the component descriptor with the adjustment; and based on receiving the failure datum and the response confirmation datum, causing a plurality of flight components of the aircraft to adjust the flight path based on the mitigating response.

13. The method of claim 12, wherein the aircraft further comprises an electric aircraft.

14. The method of claim 12, wherein the plurality of flight components includes a propulsor.

15. The method of claim 12, further comprising displaying, at the pilot interface device, the mitigating response to be performed by the plurality of flight components.

16. The method of claim 12, wherein generating the mitigating response further comprises:

receiving heuristic training data from a database correlating a failure datum to at least one heuristic element from a plurality of heuristic elements; and generating, using a supervised machine-learning process, a heuristic model that receives the failure datum as an input and produces an output containing the at least one heuristic element.

17. The method of claim 12, wherein generating a mitigating response to be performed by a flight component of the plurality of flight components further comprises:

receiving a plurality of heuristic elements; and generating the mitigating response based on the plurality of heuristic elements.

18. The method of claim 17, wherein generating the mitigating response as a function of the plurality of heuristic elements further comprises:

generating a loss function based on the failure datum and the plurality of heuristic elements;

minimizing the loss function; and selecting at least one of the plurality of heuristic elements based on the loss function.

19. The method of claim 12, wherein generating the mitigating response further comprises:

storing the failure datum in a heuristic database;

storing a plurality of heuristic elements in the heuristic database; and storing the mitigating response in the heuristic database.

20. The method of claim 12, wherein performing the mitigating response further comprises:

pulsing a torque associated with one or more rotors of the aircraft to increase an average torque while minimizing a net thrust;

utilizing a pusher rotor to stabilize the aircraft;

utilizing one or more flight surfaces associated with the aircraft in a non-coordinated way; and altering a flight path of the aircraft.

* * * * *